United States Patent [19]

Gergely

[11] 3,946,996

[45] Mar. 30, 1976

[54] MIXING AND GRANULATING APPARATUS

[75] Inventor: Gerhard Gergely, Vienna, Austria

[73] Assignee: Barmag Barmer Maschinenfabrik Aktiengesellschaft, Wuppertal, Germany

[22] Filed: Apr. 17, 1973

[21] Appl. No.: 351,864

[30] Foreign Application Priority Data

Apr. 18, 1972 Germany............................ 2218729

[52] U.S. Cl. .................... 259/10; 34/182; 209/389; 259/151; 259/157; 259/158
[51] Int. Cl.² ....................... B01F 7/08; B01F 15/02
[58] Field of Search .............. 259/9, 10, 25, 26, 45, 259/46, 151, 147, 178, 157, 158; 34/181, 182; 222/189, 343; 209/385, 389

[56] References Cited
UNITED STATES PATENTS

| | | | |
|---|---|---|---|
| 1,731,953 | 10/1929 | Thomson | 259/147 |
| 1,862,412 | 6/1932 | MacLellan | 209/385 |
| 2,092,992 | 9/1937 | Thalman | 259/9 |
| 2,521,398 | 9/1950 | North | 259/9 |
| 2,576,995 | 12/1951 | Carvel | 259/9 |
| 2,907,555 | 10/1959 | Engels | 259/9 |
| 2,911,730 | 11/1959 | Schaub | 34/181 |
| 3,524,730 | 8/1970 | Yokouchi | 259/9 |
| 3,572,652 | 3/1971 | Hale | 259/151 |

*Primary Examiner*—Robert W. Jenkins
*Assistant Examiner*—James A. Niegowski
*Attorney, Agent, or Firm*—Johnston, Keil, Thompson & Shurtleff

[57] ABSTRACT

Apparatus for mixing and granulating a finely divided solid material, preferably including a screening of the final granular product, said apparatus including a mixing drum or cylindrical vessel with closable feed and discharge means, a rotatably driven shaft on the drum axis carrying conveyance means for mixing, stirring and conveying the solid material being treated, and pivotal support means to adjustably tilt the drum such that the drum axis and the rotatable shaft are pivoted within a substantially vertical plane. There is preferably a tubular discharge member at one end of the drum to provide a suitable sieve or screening means at the point where the final granular product is withdrawn from the drum. The apparatus is particularly useful in the mixing and granulation steps required to form a multi-component powdery material into granules which can be directly pressed and shaped into tablets, pellets, pills or the like.

8 Claims, 3 Drawing Figures

MIXING AND GRANULATING APPARATUS

In the production of powdery products out of several components (active materials, auxiliaries, fillers, etc.), for example as in the production of medicines, baking powder and the like, a large number of process steps must be carried out. This is particularly true if one wishes to obtain tablets, coated pills, granulates or the like as the final product from a powder or powdery mixture. The individual steps of such a process essentially include dosing, mixing, granulation, screening to achieve a specific grain size and preferably admixing binders, lubricants and other auxiliaries required to form tablets, pellets, pills or the like.

Thus, in order to produce a mixture capable of being formed into tablets or a similar final product, the initial powdery mixture must ordinarily be conducted sequentially through mixing apparatus, a granulating machine or device, a drier, a screening device and then again another mixing machine to produce the final mixture. These process steps are relatively expensive and usually imperfect in the technical sense that the product tends to break down or separate into its component parts so as to cause a troublesome dusting which can be quite extensive, especially where there are many conveyance steps between the individual processing steps. Such dust formation is not only annoying to service personnel but may also be quite hazardous to their health.

One apparatus is known from the German Auslegeschrift No. 1,060,093 wherein a powdered mixture of active and auxiliary substance is treated with a known wetting agent in the form of a vapor and the moistened mixture is then dried under vacuum. Good mixing is maintained during the moistening and the drying steps. According to this process the mixing, granulating and drying procedure may be carried out in a single machine or apparatus. However, the recommended apparatus does not provide an essential premixing step and is very limited in achieving an effective granulation or milling, particularly because the rotational mixing principle employed in this apparatus easily leads to separation of components or a breaking down of the mixture to reform a powder. Moreover, in discharging the granulate from this apparatus and in subsequent screening as well as the admixing of lubricating agents or other auxiliary agents, there still exists a considerable danger of disintegration and formation of a powdery dust. Also, this known process is substantially limited to so-called wet granulation of pharmaceutical or similar materials and does not offer consistent or reproducible results in terms of grain size, product quality and the like.

One object of the present invention is to provide a single apparatus for the mixing and granulation of a wide variety of finely divided solid materials and especially powdery substances which require a simultaneous addition of other components such as steam, moistening agents, lubricants, adhesives, fillers, anti-sticking agents, dyes, pigments or the like.

It is especially an object of the invention to provide a relatively simple and economical apparatus which will provide the necessary mixing and so-called compaction/granulation under uniformly controlled and dust-free conditions to yield a homogeneous product in the form of sized granules capable of being directly formed into tablets.

Yet another object of the invention is to provide an apparatus in which one can carry out many different sequential steps or stages of the mixing and granulation of finely divided solids without requiring any transfer of the solids out of a closed treatment zone.

Another object of the invention is to provide mixing, granulation, sizing and discharge of the solids in an apparatus which avoids the known disadvantages in this art as noted above and particularly an apparatus which substantially reduces or prevents a breakdown or disintegration of the product to a very fine powder or dust.

These and other objects and advantages of the apparatus according to the invention will become more apparent upon consideration of the following detailed specification. This apparatus of the invention is especially suitable for mixing and granulating a finely divided solid material through all stages from initial mixing and dosing up to the discharge of a granulate capable of being directly formed into tablets and having a predetermined composition and grain size, i.e. an apparatus in which all of the required steps are readily carried out in a single container or closable vessel. The proposed apparatus of the invention is one which basically includes a closed drum-shaped or cylindrical container with a rotatably driven shaft on the drum axis which carries mixing, stirring and conveying means extending over the length of the container and adapted to maintain the desired movement of the solid material within the drum container, this container essentially being pivotally supported so as to tilt in the vertical plane occupied by the drum axis and shaft.

The mixing and granulating apparatus of the invention as illustrated more completely hereinafter comprises a closed elongated mixing drum with separate means for periodic introduction and removal of said solid material being treated, a rotatably driven shaft mounted along the drum axis with means to drive said shaft, conveyance means including at least one helical blade mounted on said shaft for mixing and stirring said finely divided solid material and extending over the length of the drum and up to the drum wall so as to convey said solid material in a direction parallel to the drum axis upon rotation of the shaft, and a support for said drum including means to adjustably tilt said drum in either direction from a normally horizontal position of the drum axis such that the force of gravity may work either with or against the conveying action of said helical blade.

The term mixing" herein is employed broadly to include not only a simple stirring or redistribution of solid particles but also an intimate mixing of two or more solids with each other and/or with liquid, vaporous or gaseous additives required in the known mixing and granulation processes. The term "granulating" as employed herein has a specific meaning of forming granules from an agglomeration, adhesion or surface build-up of smaller powdery particles. For example, processes of this type are commonly referred to as "compaction/granulation" and especially the so-called "wet compaction" in which a wetting agent or moistening agent is added to first form the granules which are then dried and preferably further mixed with lubricating and/or anti-sticking agents before they are pressed into tablets. Thus, granulation includes all of those steps required to produce the final granulated product which is to be pressed into tablets.

The drum or container of the invention is also preferably in connection with means to place the contents of the drum under a vacuum as well as means for introducing and removing the solids being treated and other additives. Such feed and discharge means are preferably valved so that the apparatus, i.e. the drum container, can be maintained under vacuum-tight conditions as well as being completely closed to the surrounding environment.

By arranging the shaft and its drive means so as to rotatably drive the shaft in both directions, i.e. either clockwise or counterclockwise, the conveying direction of helical blade conveyance means can be easily reversed at any time. While one can employ a single helical blade mounted on the shaft to extend over the length of the drum, it is especially useful for mixing, stirring and conveying the solid material to provide a plurality of helical blade segments mounted on the shaft to occupy partly overlapping intervals along the shaft while extending together over the length of the drum.

In removing or discharging the final product from the drum or cylinder, a sieve or screening means is desirably mounted in the exit or discharge outlet which is best located at one end of the drum with the sieve or screen means being substantially cylindrical so as to be fitted or suspended concentrically within a tubular discharge conduit or outlet duct fastened to the outside of the drum.

These and other preferred features of the apparatus according to the invention are disclosed in greater detail in conjunction with the accompanying drawings in which.

Figure 1:
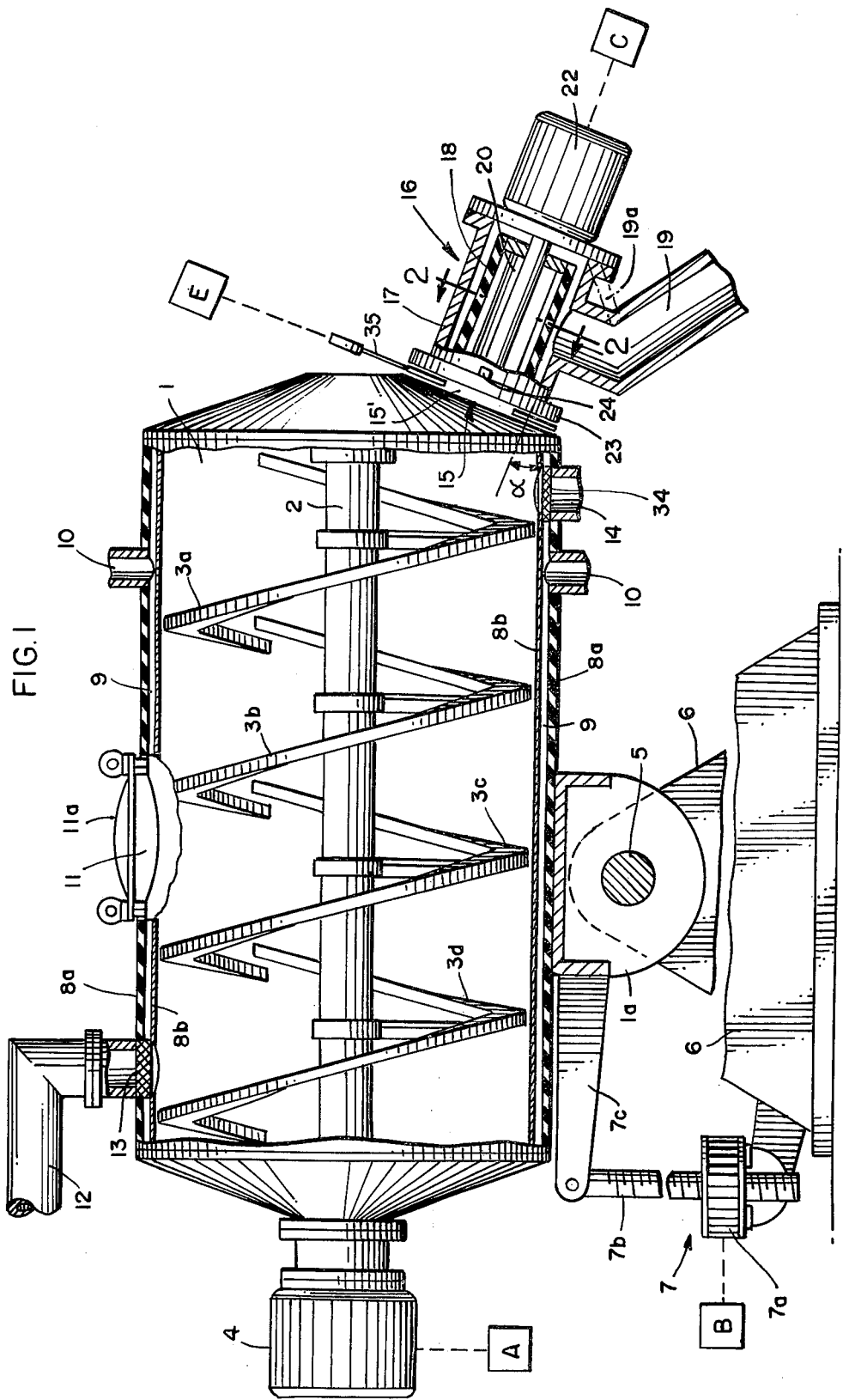
FIG. 1 is a side elevational view, partly schematic and partly in cross-section, of one preferred embodiment of the mixing and granulating apparatus of the invention.

Referring first to FIG. 1, the cylindrical drum 1 has a rotatable shaft 2 on its longitudinal axis, the shaft carrying a plurality of helical blades 3a to 3d fastened thereto such that both the shaft and the attached blades are rotatably driven by the motor 4 mounted on the left end of the non-rotatable drum 1. This motor 4 is easily designed so as to be driven in either of its two directions of rotation, i.e. as in any conventional reversible drive motor, preferably also with means for adjusting the speed of the motor (not shown).

The drum 1 is pivotally, i.e. tiltably, supported around the pivot axis 5 at the upper end of the base frame 6 or other suitable mounting means, the drum being shown in a normal horizontal position from which it can be adjustably titled or tipped such that the drum axis and the corresponding axis of shaft 2 always remain in approximately the same vertical plane. In order to obtain a desired angle of tilt or inclination of the drum for any individual operation, one can employ a suitably connected drive means or adjusting assembly 7, for example including a reversible drive motor 7a which operates a worm-gear spindle 7b pivotted at its top end to the lever arm 7c which in turn is fastened to or integral with the arcuate drum member 1a turning on the axis 5. The vertical reciprocal direction of movement of the spindle 7b thereby tilts the drum either to the left or to the right, preferably by not more than about 20° from the horizontal position of the drum axis.

The drum 1 is preferably constructed with a double wall 8a and 8b with the outer wall 8a being insulated.

The intermediate space 9 between the walls can be fed by means of conduit openings 10 with a heating agent such as hot air, steam or hot liquids. The drum itself has a large feed opening 11 which can be sealed off by the cap 11a. An outlet opening 15 at the right lower end of the drum is used to remove material from the drum. By means of a vacuum connection 12, the contents of the drum can be placed under a vacuum. A filter device 13 is used to prevent dust or powdery material from being drawn out of the drum into the vacuum line 12. The outlet opening 15 is provided with a suitable flange 23 which permits the attachment of a closing plate or other auxiliary devices. As shown in FIG. 1, a screening and discharge device 16 is attached onto the outlet opening 15 by means of flange 23 and fastening bolts 24. This discharge device 16 comprises a tubular or cylindrical housing 17 in which there is concentrically positioned a cylindrical screen 18 of smaller diameter, a discharge conduit or line 19 being attached to the lower side of the housing 17. The curved plate members 20, which are fastened onto shaft 21 and rotatably driven by motor 22, act to press the treated solid material outwardly through the screen 18. In this embodiment of the invention, the individual plates or half-plates 20 are constructed such that they first extend radially outwardly from the shaft 21 and then curve toward the screen circumference in the direction opposite to the direction of rotation of the shaft (see FIG. 2). The motor 22 is preferably a variable speed motor so as to drive the shaft 21 and plates 20 at an optimum speed or discharge rate.

The screening and discharge means 16 are thus easily mounted over a discharge opening at one end of the drum 1, preferably at the opposite end away from the drive means for mixing, stirring and conveying solid particles in the drum. The tubular housing 17 of this discharge means is preferably located so that its lowermost wall line together with the lowermost wall line of the cylindrical drum 1 form an angle α of not more than 20° (see also FIG. 3). The advantage of this construction resides in the fact that a completely free fall and the disintegration or dusting of the material can be avoided. Moreover, this discharge device is also constructed and mounted such that the mixing action in the drum need not be interrupted during the screening and discharge of the solid particles. In this manner, one can achieve a sized granulate which exhibits little or no dusting, particularly so as to avoid contaminating the working area or surrounding environment with dust.

Through the appropriate choice of the conveying direction of the helical blade means 3 and the direction of inclination of the drum 1, it becomes possible to have the blade conveying effect operate either along with or opposite to the conveying effect produced by the force of gravity. This offers a wide variety of mixing, kneading, stirring and agitating conditions to be produced in the drum and on the substances contained therein.

In the horizontal position of the drum, it is especially possible to achieve a protected mixing which permits the filling of the drum, the mixing and the drying of the mixture or the granulate under vacuum conditions.

Figure 3:
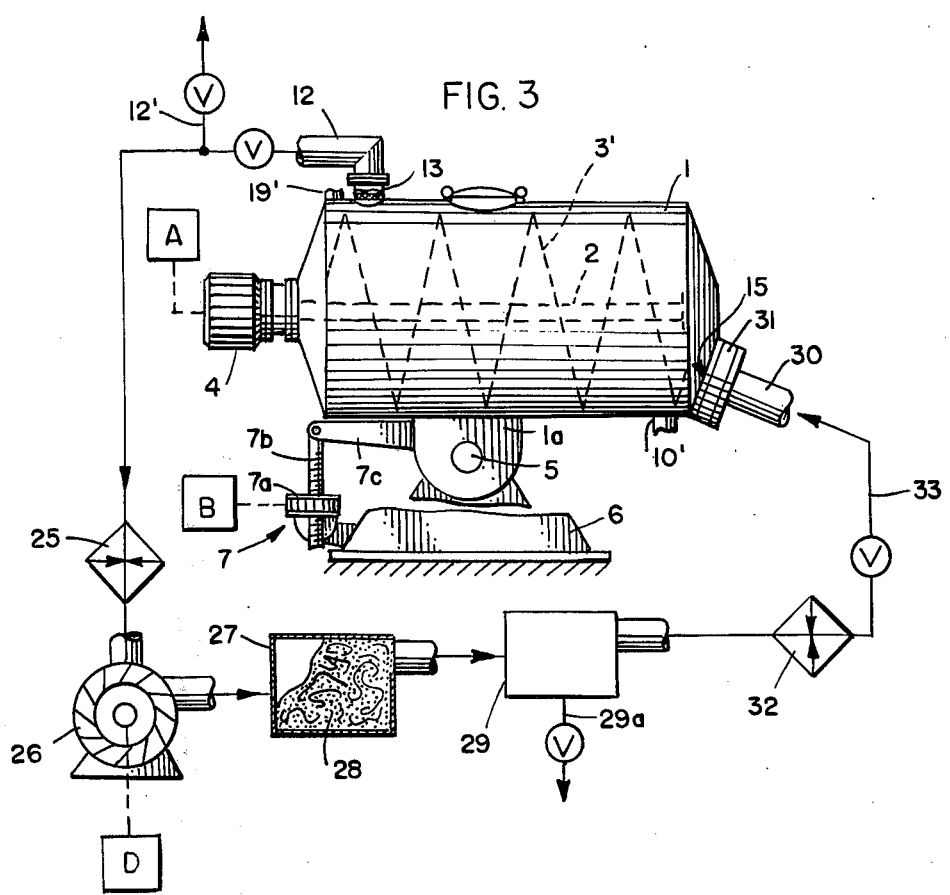
FIG. 3 is a largely schematic view similar to FIG. 1 illustrating a further modified embodiment of the invention.

By tilting the drum to the right, i.e. clockwise as shown in FIGS. 1 and 3, while simultaneously rotating the helical blade means 3 for conveyance to the right, the solid particles are pressed with greater friction against each other and against the walls. This position and operation of the drum is especially suitable for the compaction procedure in the so-called granulation of a finely divided or powdery solid material. This position also is quite useful for doping the mixture with small amounts of active agents, e.g. where a finely divided solid carrier is doped with a biologically active substance. For this doping or coating step, the active substance is preferably dissolved in a solvent and then sucked into the drum under vacuum through a line or conduit connected to the discharge opening 15. In this manner, the solvent penetrates the solid particles located before the opening 15 and is thoroughly mixed with these particles while being simultaneously evaporated, for example with hot air and/or indirect heating through the drum walls. Thereby, there is the highest statistical certainty that the active substance is uniformly distributed on the carrier particles.

By tilting the drum 1 to the left, i.e. counterclockwise as shown in FIGS. 1 and 3, while possibly providing a conveyance by the helical blades 3 to the left at the same time, the discharge device 16 or the outlet opening 15 can be emptied or exposed such that suitable screening and discharge devices as described herein or other apparatus can be exchanged or installed on the drum. Thus, it is unnecessary to stop the mixing or stirring of the solid particles in the drum when making any exchange of equipment or parts at the outlet opening 15. Moreover, in this left-tilted position, a drying operation or even the discharge procedure can be advantageously initiated. In the discharge procedure, the treated particulate solid material in the form of a granulate or the like is agitated, screened and discharged by gradually tilting the drum from the left-tilted position back into the horizontal position and then slowly conveying the solids to the right while steadily continuing the mixing, screening and discharging steps. In this manner, one can avoid a disintegration or dissociation of the granules which have been carefully formed, e.g. as in a preceding compaction-granulation operation.

Yet another use of this apparatus arises especially if the helical blade means is to be operated with a conveying direction opposed to the gravity flow of the solid particles. Thus, an intensive air intermixing can be carried out during such conveyance so that a better drying effect is achieved.

After completion of a drying step or any previous treatment of the particulated solid material in the drum up to the point of discharge, one can achieve the best screening or sizing of the final product by maintaining the drum with its axis in an approximately horizontal position or tilted slightly to the left up to about 20°, i.e. so that the discharge device 16 has its axis as represented by shaft 21 tilted by about 20° to the right as shown in FIGS. 1 and 3 up to an approximately horizontal position. The cylindrical screen 18 is preferably only partly filled at any given time with solid particles so that the blades 20 rotating with a brushing movement around the screen circumference do not need to overcome the resistance of a completely filled cylindrical screen. In general, the rate of discharge can be easily regulated together with the rate of conveyance from the drum 1 into the discharge device 16 so as to provide a careful screening or sizing operation. Individual screens 18 of different mesh sizes or different types of screen construction can be readily interchanged in the tubular housing 18. Also, it will be apparent that the discharge conduit 19 can be designed to avoid any dead spaces in the discharge device, e.g. by having a funnel shape or at least being located at the outermost or lowermost point of the housing 18 as indicated by the phantom lines 19a in FIG. 1.

Figure 2:
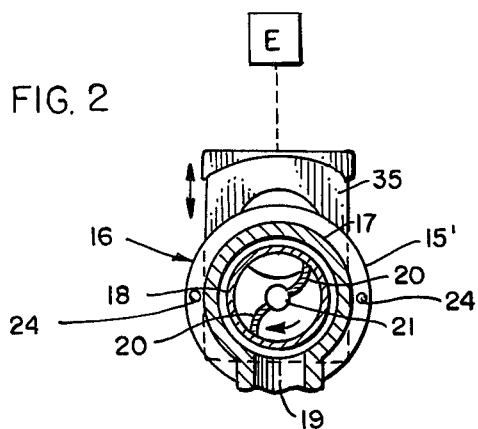
FIG. 2 is a cross-sectional view taken through the discharge and screening means located at the right end of the drum in FIG. 1.

With reference to FIG. 2, the rotating shaft carries at least one radial plate 20 as a wiping means passing circumferentially along the inner wall of the cylindrical sieve or screen 18, this plate or wiping means preferably extending axially over the entire length of the screen. These one or more plate wipers are best constructed so as to extend radially and arcuately outwardly to within very close proximity or in slight brushing contact with the inner screen wall, i.e. the ends or tips of the plate being offset in the circumferential direction of the screen wall opposite to the direction in which the shaft 21 turns (as indicated by the arrow of rotation of the shaft and wiping plates in FIG. 2). Other plate or wiping means may also be used for specific purposes, and while such wiping means can be interchangeably fastened to the shaft 21, it is preferable to permanently fasten the plates 20 or the like to the shaft 21 and to interchange an entire unit consisting essentially of the housing, cylindrical screen, shaft and wiping means. The discharge nozzle, conduit or opening 19 may also be adapted to specific discharge operations, i.e. to conform to the material being discharged.

In FIG. 3, there is schematically illustrated a combination of apparatus for carrying out a complete drying procedure or drying stage. The drum 1 with a single helical blade 3' in this instance is provided with hot air circulation through the connecting lines 12 and 30, the latter being connected over a modified screening device 31 to the discharge opening 15 of the drum 1. The circulated air is drawn off from the drum 1 through line 12 and is heated in a conventional heat exchanger 25, e.g. by indirect heat exchange with steam or another fluid heat exchange medium. The withdrawal of the air and its circulation is accomplished by means of the centrifugal blower 26, the air being passed by this blower into a drying chamber 27 which can be filled with any suitable drying medium 28 through which the air can pass for removal of moisture, vaporous solvent or the like. Evaporated gases or solvent vapors are preferably removed directly from the drum 1 by a suitable bleed line 12' and/or a condenser and gas/liquid separator (not shown) in line 12 between the filter 13 and the heat exchanger 25. From the drying chamber 27, the air is then blown through a sieve device 29 to recover any dust or similar entrained particles. On the other hand, where there is little or practically no entrained solids, the unit 29 can be a conventional liquid and vapor separator, e.g. to separate condensed solvent and/or other liquids through line 29a.

Before being reintroduced into the drum, the air can again be further heated in another heat exchanger 32. The air then passes through the feed line 33 over the line connection 30 and screening device 31 through the opening 15 into the finely divided or pulverulent solid material maintained within the drum by the screening device 31. The mixture of finely divided solids is strongly agitated and thoroughly dried by the hot air stream on the one hand and by the mixing and conveying action of the helical blade 3' on the other hand.

The screening device 31 of FIG. 3 preferably consists of a very fine mesh filter fabric, a sinter filter or a fleece-type filter. Such filters cause a broad, uniform distribution of the air stream and the formation of a turbulent bed or so-called fluidized layer of the finely divided mixture of particulate solids. This joint application of an air stream together with the through mixing produced by the gravity flow of solid material and the simultaneous conveying action of the helical blade guarantees the quickest possible drying according to the so-called air-suspension principle.

The drum 1 can also be heated for the drying procedure by passing a heating fluid through one inlet conduit 10 into the wall space between the outer insulated wall 8a and an inner heat-conducting wall 8b, and withdrawing the heating fluid through the other conduit 10 where necessary. As shown in FIG. 3, the inlet and outlet pipes 10' for the heating medium can be located at diagonally opposite positions at the top and bottom lines of the drum, respectively. This is especially desirable to provide a relatively uniform heating within the drum itself while substantially reducing the extent to which the circulated air must be preheated outside of the drum. Whether heated or not, this inner wall 8b is preferably composed of a non-rusting and corrosion resistant material, especially a polished material such as stainless steel or a suitable alloy.

In still another variation, at least a portion of the inner drum wall 8b along the bottom surface of the drum 1 can be constructed as a porous screen or filter, e.g. a sinter filter or a finely perforated metal plate or the like, so that hot air can be introduced over the entire bottom surface below the bed or layer of finely divided solids, thereby providing a very uniform drying effect with continuous mixing also with the helical blade 3'.

Finally, as indicated in FIG. 1, hot air or other vapors or gases can also be introduced into the drum through the inlet pipe 14 which preferably includes a sinter filter 34 or other suitable filter means to prevent the finely divided or powdery solids from escaping through this inlet. One or more of these inlets 14 with filters 34 can be distributed at optional positions in the bottom portion of the drum 1, i.e. until it becomes more feasible to use a perforated or filter-like inner wall member as noted above.

It is desirable to use filters in order to ensure that dust or very fine powdery material is kept within the drum, at least until larger dust-free particles are present such as a granulate which is capable of being directly formed into tablets. For example, filters 13 and 34 are placed over any otherwise unclosed opening into the drum, i.e. openings used for introducing or removing various substances from the drum. These filters can be provided with means to periodically clean the filter material without removing it from the drum, for example, as disclosed in detail in the copending application of Müller et al, Ser. No. 319,698, filed Dec. 29, 1972 now abandoned, the disclosure of which is incorporated herein by reference as fully as if set forth in its entirety. In essence, such self-cleaning filters are preferably in the form of a flexible or extensible filter material, especially a fine mesh filter fabric, with means to abruptly tensioning the filter material after at least temporarily relaxing it, thereby dislodging entrapped or adhering particles.

As further indicated in FIGS. 1 and 3 of the drawing, it is quite feasible to provide automatic control means A, B, C and/or D in order to control each of the individual operations or process steps in the drum either in response to a predetermined programming means or in direct response to process conditions or measurements such as temperature, time, pressure or vacuum, relative humidity, etc. Thus, control means A can be preset to provide a constant rotation of the mixing and conveying means over the entire operation or to change the speed of rotation and/or its direction at predetermined points of time or in response to the initiation of specific mixing, vapor injection, drying or other steps.

The tilting of the drum can be automatically carried out over control means B, e.g. so as to set the drum in certain positions at programmed points of time in the overall mixing and granulation process. Control means C is used to regulate the motor 22 while control means D for operation of blower 26 can be actuated in response to a tilting of the drum into a drying position or in response to a vapor content in the drum, the temperature or similar conditions. Additional control means can be used to operate valves in individual feed and discharge lines or openings in the drum, including the feed opening 11 or discharge opening 15, so that the drum can be completely sealed in a vacuum-tight manner. Thus, closure plate 35, which is slidably inserted in top and bottom slots of the circular socket 15', is shown with the double-headed arrow indicating its movement in a partly closed position in FIG. 2. This plate 35 can be periodically actuated by control means E to open or shut the entrance 15 into the screening device 16. This plate 35 may also have a finely perforated portion or a second plate with fine perforations can be used in order to inject hot air or spray a solvent into the drum even during a mixing and tilting operation.

The time required for the mixing and granulation process is substantially reduced, particularly in the drying step where the drum is connected into a hot air circulation with suitable filter means to prevent escape or circulation of very fine particles out of the drum and preferably with a suitable liquid and vapor separator in the recycle line. Where the apparatus is used for producing a granulate according to the wet compaction process or the so-called coating process, the air-turbulence drying together with a relatively gentle but continuous mixing forms a very uniform and high quality granulate without any substantial loss of valuable materials.

The screening and discharge device of the invention is of special advantage because it avoids a disintegration or dusting of the formed granulate in contrast to known conventional screening apparatus. Moreover, this screening and discharge device is very easily mounted or dismounted at the discharge opening located at one lower extreme end of the drum container. When using a plate valve or the like over the discharge opening which leads into the screening means, it is feasible to engage or disengage the screening means and its discharge of the solids as desired.

Not only does the drum mixer and granulater of the invention ensure carefully controlled reproducible process conditions in the treatment and production of various powders and granulates but it also keeps the powdery or granulated material from coming into contact with the outer environment and avoids any necessity of transport or conveyance outside of the drum in going from step to step or stage to stage of a mixing and granulating process. The combination of elements in this apparatus thus provides a very effective and versatile piece of equipment for handling finely divided solids during all stages of mixing, stirring, conveying, drying, screening and the like. At the same time, there is a great reduction in cost where all such steps are to be carried out in a single drum which is in itself relatively simple and inexpensive in construction The invention is hereby claimed as follows:

1. Apparatus for mixing and granulating a finely divided solid material which comprises:

a closed elongated mixing drum having a tiltable axis of rotation and separate means for periodic introduction and removal of said solid material being treated; including a drum discharge opening arranged approximately tangential to the lowermost inner wall line extending axially of the drum and a tubular discharge housing fastened over said discharge opening externally of the drum and in an inclined position with reference to the drum axis, a cylindrical screening communicating with said discharge opening and means being mounted concentrically within said tubular discharge housing above a discharge outlet in said housing and an independently rotatable discharging means being mounted inside of said screen means to press solid material flowing through said discharge opening outwardly through said screen means and said discharge outlet;

a rotatably driven shaft mounted along the drum axis with means to rotatably drive said shaft in a clockwise or a counterclockwise direction;

conveyance means including at least one helical blade mounted on said shaft for mixing and stirring said finely divided solid material and extending over the length of the drum and up to the drum wall so as to reversibly convey said solid material in a direction parallel to the drum axis upon rotation of the shaft; and a rotatable support for said drum including means to adjustably tilt and lock said drum in either positions above or below a normally horizontal position of the drum axis such that the force of gravity may work either with or against the conveying action of said helical blade.

2. Apparatus as claimed in claim 1 wherein said drum is in connection with means for placing the contents of the drum under a vacuum.

3. Apparatus as claimed in claim 1 wherein a single helical blade is mounted on said shaft to extend over the length of the drum for mixing, stirring and conveying said solid material.

4. Apparatus as claimed in claim 1 wherein a plurality of helical blade segments are mounted on said shaft to occupy partly overlapping intervals along the shaft and to extend together over the length of the drum for mixing, stirring and conveying said solid material.

5. Apparatus as claimed in claim 1 wherein the lowermost inner wall line of the tubular housing forms an angle of less than 20° with the corresponding lowermost inner wall line of the drum.

6. Apparatus as claimed in claim 1 wherein said rotatable discharging means includes at least one radially arcuate plate mounted on a rotatably driven shaft, said plate having its outer end turned opposite to its turning direction to exert a wiping action along the inner wall surface of the screen member.

7. Apparatus as claimed in claim 3 wherein said helical blade is restricted to a narrow annular zone adjacent said drum wall and is connected to said shaft by radial spoke means.

8. Apparatus as claimed in claim 4 wherein each helical blade segment is restricted to a narrow annular gap adjacent said drum wall and is connected to said shaft by radial spoke means.

* * * * *

UNITED STATES PATENT AND TRADEMARK OFFICE
CERTIFICATE OF CORRECTION

PATENT NO. : 3,946,996
DATED : March 30, 1976
INVENTOR(S) : Gerhard Gergely

It is certified that error appears in the above-identified patent and that said Letters Patent are hereby corrected as shown below:

In Column 9, Line 14, after "screening" insert --means--

In Column 9, Line 15, delete "means"

Signed and Sealed this

Eleventh Day of April 1978

[SEAL]

Attest:

RUTH C. MASON
Attesting Officer

LUTRELLE F. PARKER
Acting Commissioner of Patents and Trademarks